(12) United States Patent
O'Brian et al.

(10) Patent No.: US 12,013,912 B2
(45) Date of Patent: *Jun. 18, 2024

(54) SHARING UNMANAGED CONTENT USING A CONTENT MANAGEMENT SYSTEM

(71) Applicant: Dropbox, Inc., San Francisco, CA (US)

(72) Inventors: George O'Brian, San Francisco, CA (US); Jiten Vaidya, San Francisco, CA (US); Bo Hu, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,113

(22) Filed: May 31, 2023

(65) Prior Publication Data

US 2023/0306069 A1 Sep. 28, 2023

Related U.S. Application Data

(63) Continuation of application No. 17/152,199, filed on Jan. 19, 2021, now Pat. No. 11,704,379, which is a
(Continued)

(51) Int. Cl.
*G06F 16/00* (2019.01)
*G06F 3/06* (2006.01)
(Continued)

(52) U.S. Cl.
CPC ............ *G06F 16/955* (2019.01); *G06F 3/067* (2013.01); *G06F 16/137* (2019.01);
(Continued)

(58) Field of Classification Search
CPC ...... G06F 16/955; G06F 3/067; G06F 16/137; G06F 16/176; G06F 16/183; G06F 16/182; G06F 16/184; G06F 16/1844
See application file for complete search history.

(56) References Cited

U.S. PATENT DOCUMENTS

| | | |
|---|---|---|
| 4,951,192 A | 8/1990 | Chase, Jr. et al. |
| 5,079,695 A | 1/1992 | Dysart et al. |
| (Continued) | | |

FOREIGN PATENT DOCUMENTS

| | | |
|---|---|---|
| JP | 2014511129 A | 5/2014 |
| WO | 2013188078 A2 | 12/2013 |

OTHER PUBLICATIONS

Brief Communication of Oral Proceeding on Nov. 3, 2020 for European application No. 15742482.1, dated Nov. 25, 2020, 12 pages.
(Continued)

*Primary Examiner* — Noosha Arjomandi
(74) *Attorney, Agent, or Firm* — Polsinelli PC

(57) ABSTRACT

In some implementations, a subscriber to an online content management system can share content items that are external to the subscriber's content library. A computing device can include managed content items associated with the subscriber's content library. The computing device can include unmanaged content items that are stored externally to the subscriber's content library. The subscriber can provide input associated with an unmanaged content item to generate a link (e.g., URL, file path, location reference, etc.) for the unmanaged content item. When generating the link, the unmanaged content item can be uploaded to the online content management system and stored separately from the subscriber's content library. The generated link can be shared with recipient user (e.g., subscriber or non-subscriber). The generated link can be used by the recipient to access the unmanaged content item uploaded to and stored by the online content management system.

20 Claims, 7 Drawing Sheets

Related U.S. Application Data continuation of application No. 14/448,173, filed on Jul. 31, 2014, now abandoned.

(60) Provisional application No. 62/026,996, filed on Jul. 21, 2014.

(51) Int. Cl.
*G06F 16/13* (2019.01)
*G06F 16/176* (2019.01)
*G06F 16/182* (2019.01)
*G06F 16/955* (2019.01)

(52) U.S. Cl.
CPC .......... *G06F 16/176* (2019.01); *G06F 16/183* (2019.01); *G06F 16/182* (2019.01); *G06F 16/184* (2019.01); *G06F 16/1844* (2019.01)

(56) References Cited

U.S. PATENT DOCUMENTS

| | | | |
|---|---|---|---|
| 6,571,245 | B2 | 5/2003 | Huang et al. |
| 8,935,192 | B1* | 1/2015 | Ventilla ............... G06Q 50/01 706/50 |
| 9,183,303 | B1* | 11/2015 | Goel ................... G06F 16/23 |
| 9,521,172 | B1* | 12/2016 | Goenka ............... H04L 65/403 |
| 9,652,780 | B2* | 5/2017 | Barton ................ H04L 67/535 |
| 10,866,926 | B2* | 12/2020 | Mertens ............. G06F 16/9032 |
| 10,977,219 | B2* | 4/2021 | Beckmann ........... G06F 16/22 |
| 2005/0192966 | A1* | 9/2005 | Hilbert ................. H04L 51/08 |
| 2010/0138387 | A1* | 6/2010 | Simelius ............. G06F 16/178 707/E17.116 |
| 2010/0333116 | A1 | 12/2010 | Prahlad et al. |
| 2011/0040788 | A1* | 2/2011 | March ................ G06F 16/1873 711/E12.001 |
| 2012/0173558 | A1 | 7/2012 | Sorenson, III et al. |
| 2012/0331108 | A1 | 12/2012 | Ferdowsi et al. |
| 2013/0013560 | A1 | 1/2013 | Goldberg et al. |
| 2013/0212569 | A1 | 8/2013 | Young et al. |
| 2013/0282830 | A1* | 10/2013 | Besen ................. G06F 16/119 709/205 |
| 2014/0091142 | A1 | 4/2014 | Pacque et al. |
| 2014/0122451 | A1 | 5/2014 | Euresti et al. |
| 2014/0164534 | A1* | 6/2014 | Fushman ............. H04L 67/06 709/206 |
| 2014/0181935 | A1 | 6/2014 | Beckmann et al. |
| 2014/0215568 | A1* | 7/2014 | Kirigin ................ G06F 21/6218 726/4 |
| 2015/0019614 | A1* | 1/2015 | Pierre-March ......... H04L 67/60 709/201 |
| 2015/0134679 | A1* | 5/2015 | Balakrishnan ........ G06F 16/13 707/756 |
| 2015/0256499 | A1* | 9/2015 | Kumar ................ G06Q 10/107 707/755 |
| 2021/0200822 | A1* | 7/2021 | O'Brian ............... G06F 16/183 |
| 2022/0191251 | A1* | 6/2022 | Gavish ................ H04L 63/101 |

OTHER PUBLICATIONS

Communication Pursuant to Article 94(3) EPC for European Application No. 21156628.6 dated Jun. 21, 2021, 13 pages.
Decision to refuse European Patent Application No. 15742482.1 dated Dec. 11, 2020, 4 pages.
Examination Report No. 2, for Australian Application No. 2018226432, dated Dec. 9, 2019, 6 pages.
Examination Report No. 3, for Australian Application No. 2018226432, dated Apr. 22, 2020, 4 pages.
Examination Report No. 1 for Australian Application No. 2015294400 dated Apr. 19, 2018, 6 pages.
First Examination Report for Australian Application No. 2020203219 dated Jul. 20, 2021, 4 pages.
International Search Report and Written Opinion for PCT Application No. PCT/US2015/040339 dated Oct. 9, 2015, 13 pages.
Jansen C., "Techopedia Definition of Distributed File System," Jul. 8, 2014, snapshot retrieved from https://web.archive.org/web/20140708035249/https://www.techopedia.com/definition/1825/distributed-file-system-dfs on Jun. 20, 2018, 2 pages.
Lancet Y., "5 Ways to Send Files to Your Dropbox Without Using Dropbox," Aug. 1, 2011, XP055209928, retrieved from online at http://www.makeuseof.com/tag/5-ways-send-filesdropbox-dropbox/ on Aug. 27, 2015, 5 pages.
Notice of Allowance from U.S. Appl. No. 17/152,199, dated Mar. 14, 2023, 12 pages.
Second Examination Report for Australian Application No. 2020203219 dated Jan. 27, 2022, 4 pages.
Summons to attend oral proceedings pursuant to Rule 115(1) EPC for European application No. 15742482.1, dated May 25, 2020, 11 pages.
Anonymous: "Namespace," Wikipedia, Jul. 4, 2014, pp. 1-11, Retrieved from the Internet: URL: https://en.wikipedia.org/w/index.php?title=Namespace&direction=prev&oldid=618032502.
Communication Pursuant to Article 94(3) EPC for European Application No. 21156628.6 dated Jan. 25, 2024, 11 pages.

\* cited by examiner

SHARING UNMANAGED CONTENT USING A CONTENT MANAGEMENT SYSTEM

CROSS-REFERENCE TO RELATED APPLICATIONS

This application is a continuation of U.S. application Ser. No. 17/152,199, filed on Jan. 19, 2021, entitled, SHARING UNMANAGED CONTENT USING A CONTENT MANAGEMENT SYSTEM, which is a continuation of U.S. application Ser. No. 14/448,173, filed on Jul. 31, 2014, entitled, SHARING UNMANAGED CONTENT USING A CONTENT MANAGEMENT SYSTEM, which claims the benefit of priority under U.S.C. § 119(e) to U.S. Provisional Patent Application 62/026,996, filed on Jul. 21, 2014, entitled, SHARING UNMANAGED CONTENT USING A CONTENT MANAGEMENT SYSTEM, all of which are hereby expressly incorporated herein by reference in their entireties.

TECHNICAL FIELD

The present technology pertains to sharing content between devices.

BACKGROUND

Online content management systems enable subscribers to the system to store content items online so that the content items can be accessed from a variety of client devices. These online content management systems enable a subscriber to upload content items to the online content storage by adding the content items to the subscriber's content library on a client device and access the stored content items in the subscriber's content library from the online storage. These online content management systems often include features that allow a subscriber to share stored content items with other subscribers and non-subscribers ("recipients"). However, the subscriber is limited to sharing content items that are within the subscriber's content library and managed by the online content management system.

SUMMARY

In some implementations, a subscriber to an online content management system can share content items that are external to the subscriber's content library. A computing device can include managed content items associated with the subscriber's content library. The computing device can include unmanaged content items that are stored externally to the subscriber's content library. The subscriber can provide input associated with an unmanaged content item to generate a link (e.g., URL, file path, location reference, etc.) for the unmanaged content item. When generating the link, the unmanaged content item can be uploaded to the online content management system and stored separately from the subscriber's content library. The generated link can be shared with recipient user (e.g., subscriber or non-subscriber). The generated link can be used by the recipient to access the unmanaged content item uploaded to and stored by the online content management system.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

Figure 1A:
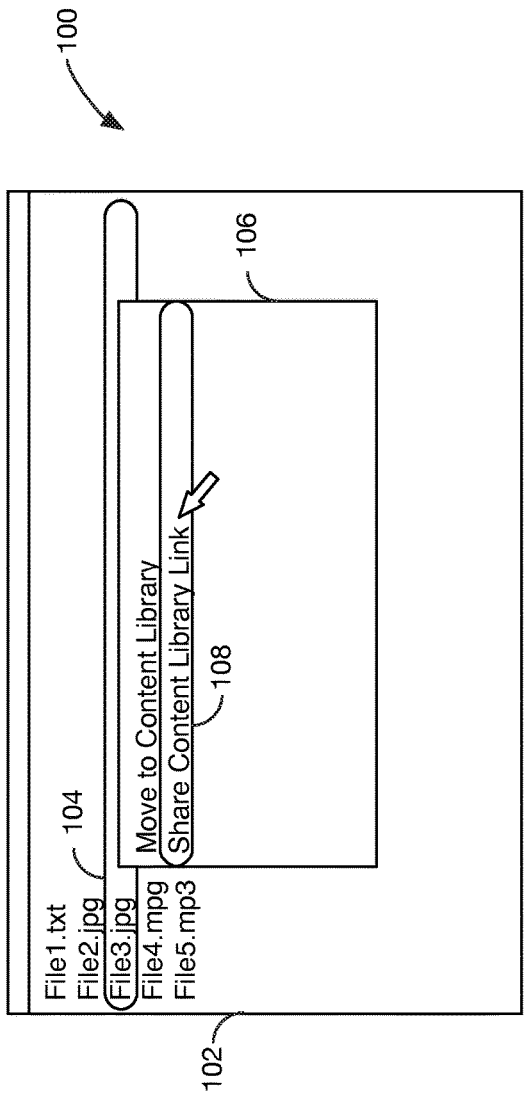
FIGS. 1A-1C illustrate example graphical user interfaces for sharing an unmanaged content item.
Figure 1B:
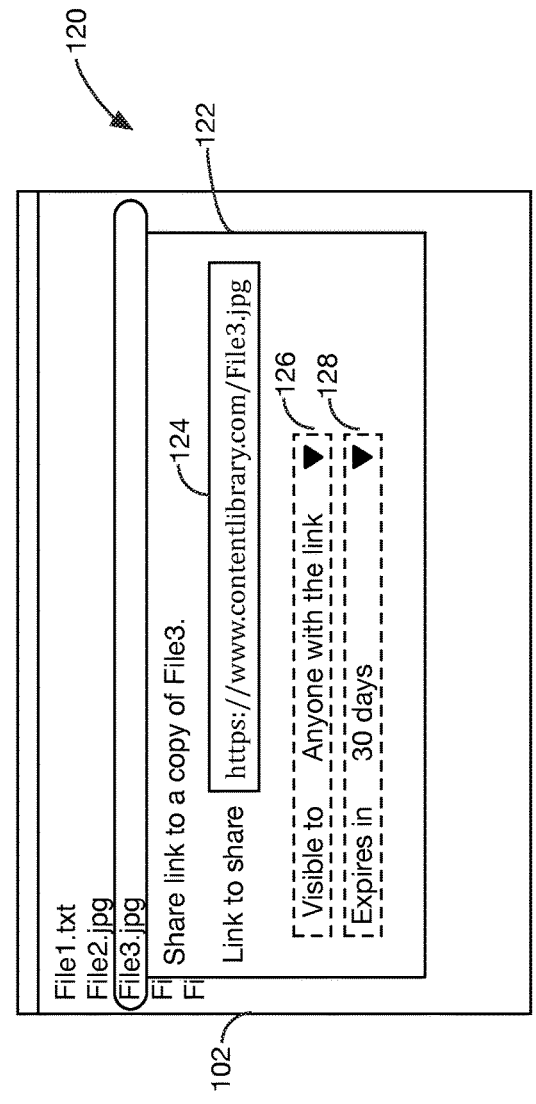
Figure 1C:
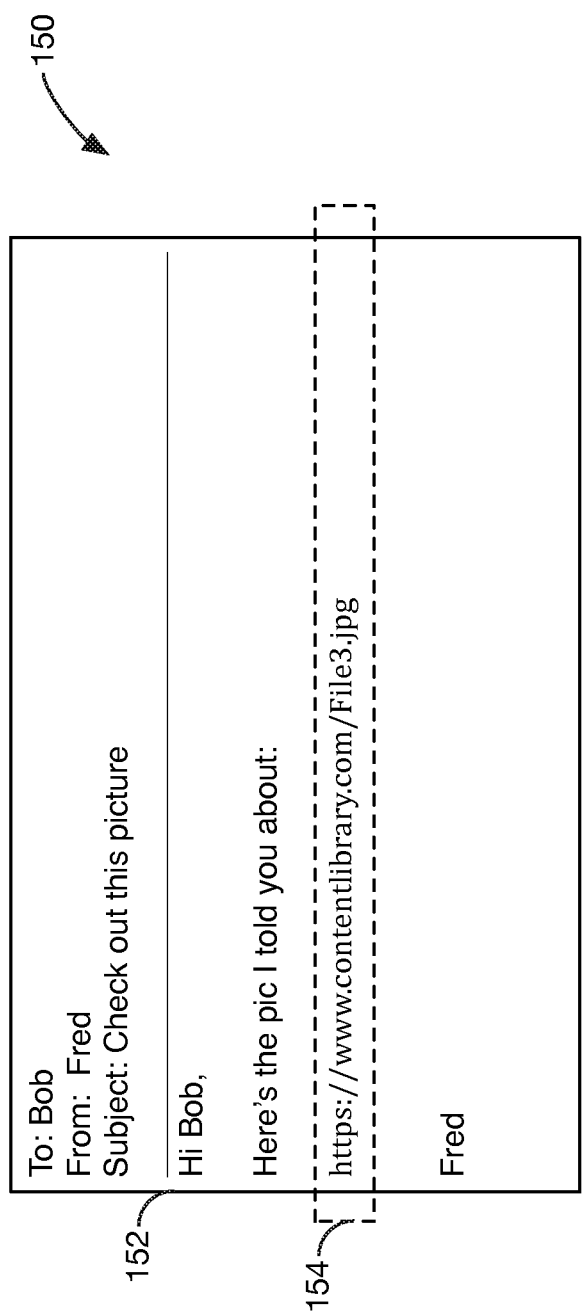

FIGS. 1A-1C illustrate example graphical user interfaces (GUI) 100, 120 and 150 for sharing an unmanaged content item. For example, a content library can consist of any number of individual content items that are managed by the online content management system. A content items associated with a content library can coexist on a client computer system with file directory structure that includes content items that are not managed by the online content management system. Thus, an unmanaged content item is a content item that is external to a subscriber's content library and, therefore, not managed by the online content management system that manages (e.g., stores, synchronizes, etc.) the subscriber's content library across devices. A content item (e.g., managed and unmanaged) can be any type of file such as a document, text file, audio file, video file, etc. Further, a content item can be a folder or other mechanism of grouping content items together.

In some implementations, a computing device (e.g., mobile device, handheld device, laptop computer, tablet computer, client device, etc.) can be configured to display graphical user interfaces 100, 120 and 150 to allow a subscriber of an online content management system to share an unmanaged content item with a recipient user (e.g., other subscriber's and non-subscribers of the online content management system).

FIG. 1A illustrates an example graphical user interface 100 for selecting an external content item to share with a recipient user. For example, GUI 100 can include a graphical element 102 (e.g., a window) representing a file system folder of a client device. For example, a client device can be a computing device that is configured to store a copy of the subscriber's content library and synchronize content items in the content library with the online content management system. A client device can be a computing device that is capable of accessing the online content management system and accessing a subscriber's online content library.

In some implementations, the file system folder displayed by graphical element 102 can be a folder that is external to a content library managed by the online content management system. The content items in the file system folder can also be external to the content library and, therefore, unmanaged. A user (e.g., subscriber) of the client device can select an unmanaged content item 104 presented by graphical element 102 to cause graphical element 106 to be displayed. Graphical element 106 can be a popup window, a pull down menu, or other graphical element for presenting and selecting functions to be performed on a selected unmanaged content item. For example, graphical element 106 can include a selectable item for adding or moving the selected unmanaged content item to the user's content library.

In some implementations, graphical element 106 can include a selectable item 108 for sharing the selected unmanaged content item 104 with a recipient. For example, the user can select item 108 to cause a link (e.g., URL, file path, invocable reference, etc.) to be generated for the selected unmanaged content item 104. For example, upon selection of unmanaged content item 104, the client device can upload the unmanaged content item 104 to the online content management system. The online content management system can return to the client device a link to the online copy of unmanaged content item 104 stored by the online content management system. The online content management system can store unmanaged content item 104 externally to the user's content library while allowing a recipient of the link to access the unmanaged content item 104 online.

FIG. 1B illustrates an example graphical user interface 120 for specifying accessibility parameters for the shared link. For example, GUI 120 can be displayed in response to the user selecting to share a link to an unmanaged content item, as described above with reference to FIG. 1A. GUI 120 can include graphical element 122 (e.g., a window, popup, etc.) that presents the generated link 124 (e.g., URL), graphical element 126 (e.g., pull down menu) that allows the user to specify who can access the link, and graphical element 128 (e.g., pull down menu) that allows the user to specify an expiration date for the link. For example, when selected by the user, graphical element 126 can present a selectable list of options (e.g., anyone, a particular group, a particular recipient) that the user can select to specify who can access the generated link. When a recipient user who has not been granted access attempts to use the link to access the unmanaged content item, the recipient will receive a notification that indicates that the user is not authorized to access the link. When selected by the user, graphical element 128 can present a selectable list of options (e.g., 1 day, 30 days, 2 months, 1 year, etc.) that the user can select to specify an expiration date for the generated link. When the expiration date arrives, the online content management system will make the link inactive. Recipients who attempt to use the link after the expiration date will receive a notification from the online content management system that indicates that the link is no longer active. In some implementations, a user can provide express input to cancel a link. For example, a user interface can be displayed that shows a list of generated links. The user can select a graphical element (e.g., button) next to a link to cancel the link. Recipients who attempt to use the canceled link will receive a notification from the online content management system that indicates that the link is no longer active.

FIG. 1C illustrates an example graphical user interface 150 for sharing a link to an unmanaged content item. For example, graphical user interface 150 can be a user interface of an electronic messaging application that is configured on the client device. GUI 150 can include a graphical element 152 (e.g., window) for presenting the content of an electronic message (e.g., text message, instant message, email message, etc.). After the user has generated a link to the unmanaged content item using GUI 100 and/or GUI 120, the user can paste text 154 (e.g., URL, file path, etc.) representing the link into the electronic message. The user can then send the electronic message containing the link to the recipient. Upon receipt of the electronic message, the recipient can select text 154 to invoke the link and view the unmanaged content item represented (e.g., referenced) by the link. For example, upon selection of the link, a web browser window can be opened and the linked unmanaged content item can be displayed in the web browser window. If the linked unmanaged content item is not available for viewing, then the web browser window can display an error message, as described further below.

Figure 2:
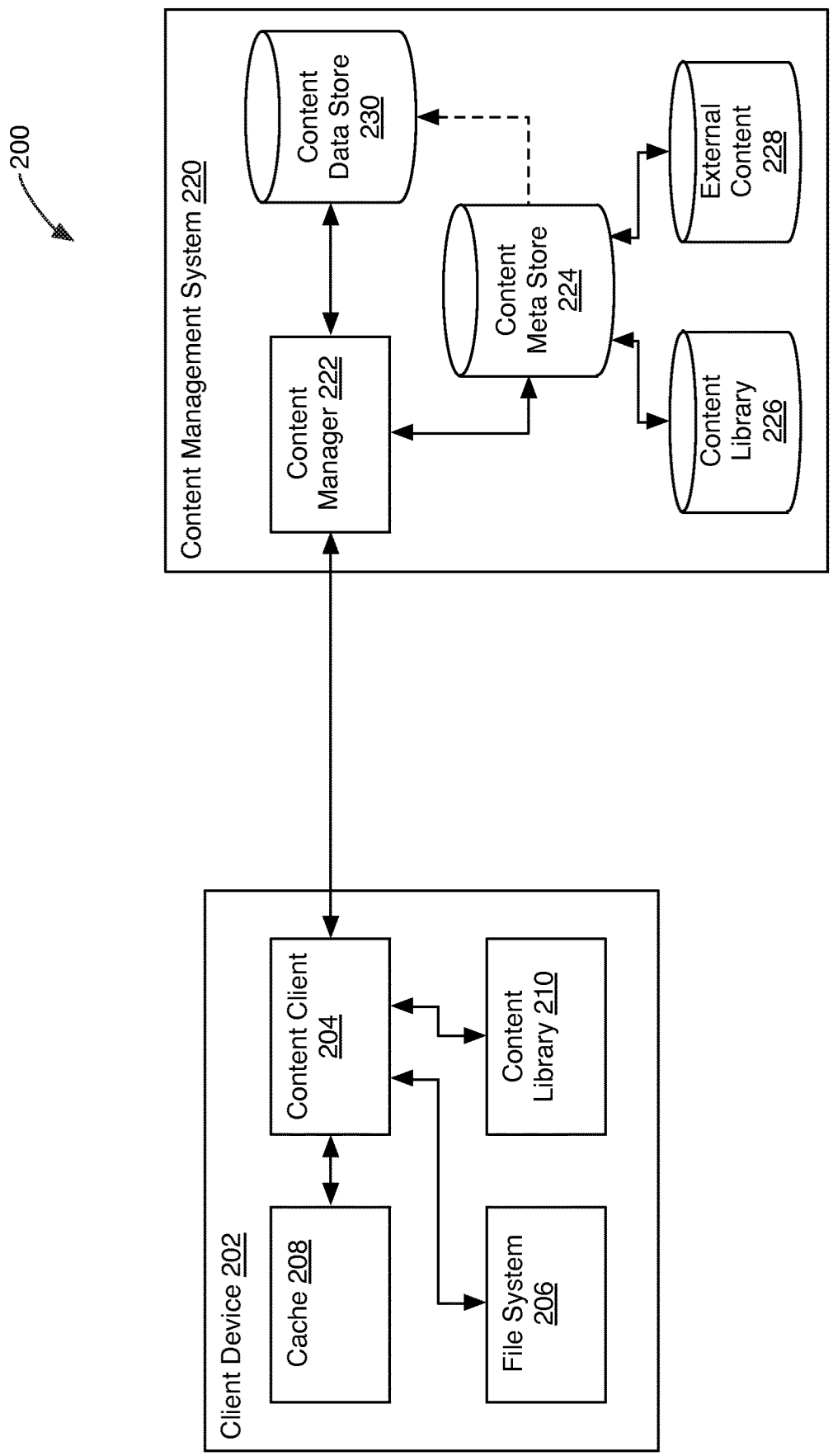
FIG. 2 is a block diagram illustrating an example system for sharing an unmanaged content item using an online content management system.

FIG. 2 is a block diagram illustrating an example system 200 for sharing an unmanaged content item using an online content management system. System 200 can include client device 202 and online content management system 220. For example, online content management system 220 can include multiple servers, databases and other computing devices to handle the large-scale data processing and storage requirements of the content management system 220. The components of online content management system 220 described herein can be configured on one or more of the servers, databases, and other devices that make up the online content management system.

In some implementations, client device 202 can include a content client 204 that manages a local content library 210 on client device 202. The content library 210 can include various content items that are managed by online content management system 220 and synchronized with other client devices. In some implementations, content client 204 can communicate with content manager 222 on content management system 220 to synchronize content library 210 with content library 226 on content management system 220.

In some implementations, content library 210 can be stored by content management system 220 as content metadata in content meta store 224 and content data blocks in content data store 230. For example, content manager 222 can store metadata representing content library 210 in content meta store 224 (e.g., a database, data store, database table, etc.). In some implementations, content meta store 224 can include content library metadata 226 for each content library managed by content management system 220.

In some implementations, metadata for different content libraries can be distinguished using namespaces. For example, the content library for a first user can be associated with a first namespace. The content library for a second user can be associated with a second namespace. When a client device (e.g., client device 202) synchronizes its content library (e.g., content library 210) with content management system 220, the client device will receive content associated with the namespace associated with the client's content library. Thus, only content items associated with the user's content library namespace will be displayed in the user's content library.

In some implementations, the metadata stored in content library 226 can describe the content of content library 210 (e.g., content item locations, content item sizes, content item identifier, etc.). For example, the metadata stored in content library 226 can mimic the directory structures (e.g., directory hierarchy) of content library 210. The metadata stored in content library 226 can reference (e.g., using a pointer or memory address) data blocks stored in content store 230 corresponding to the content (e.g., files of various types) associated with the content library 210. Thus, the metadata stored in content library 226 can be used by content manager 222 to retrieve content data for the content items stored in content library 210.

In some implementations, content data store 230 (e.g., a database, file system, etc.) can store data blocks corresponding to content items managed by the content manager 222. For example, when content client 204 synchronizes content library 210 with content management system 220, the content data (e.g., files, data blocks, etc.) for each content item in content library 210 can be stored in and retrieved from content store 230. In some implementations, content data blocks stored on content store 230 are indexed by hash values. For example, the hash values can be generated by a client device or a server device by hashing the contents of the corresponding data block. The index for a particular data block is the hash value generated based on data in the particular data block.

In some implementations, content manager 222 can use the content item metadata stored in content meta store 224 to look up stored content items (e.g., data) in content data store 230. For example, a user of client device 202 can share a link to a managed content item in content library 210. The recipient can use the link to send a request to content manager 222 to access the linked content item (e.g., the link is a reference to the linked content item). Content manager 222 can receive the request from the recipient that identifies the managed content item. The content item can be identified by a link, URL, content path, or other identifier. The content manager 222 can compare the content item identifier to the content identifiers (e.g., link, URL, content path, etc.) stored in content library 226 to identify a matching content item metadata entry in content library 226. The content manager 222 can use the pointer in the matching content item metadata to look up the content item data blocks stored in content data store 230 and return the content item data to the requesting client device.

Figure 3:
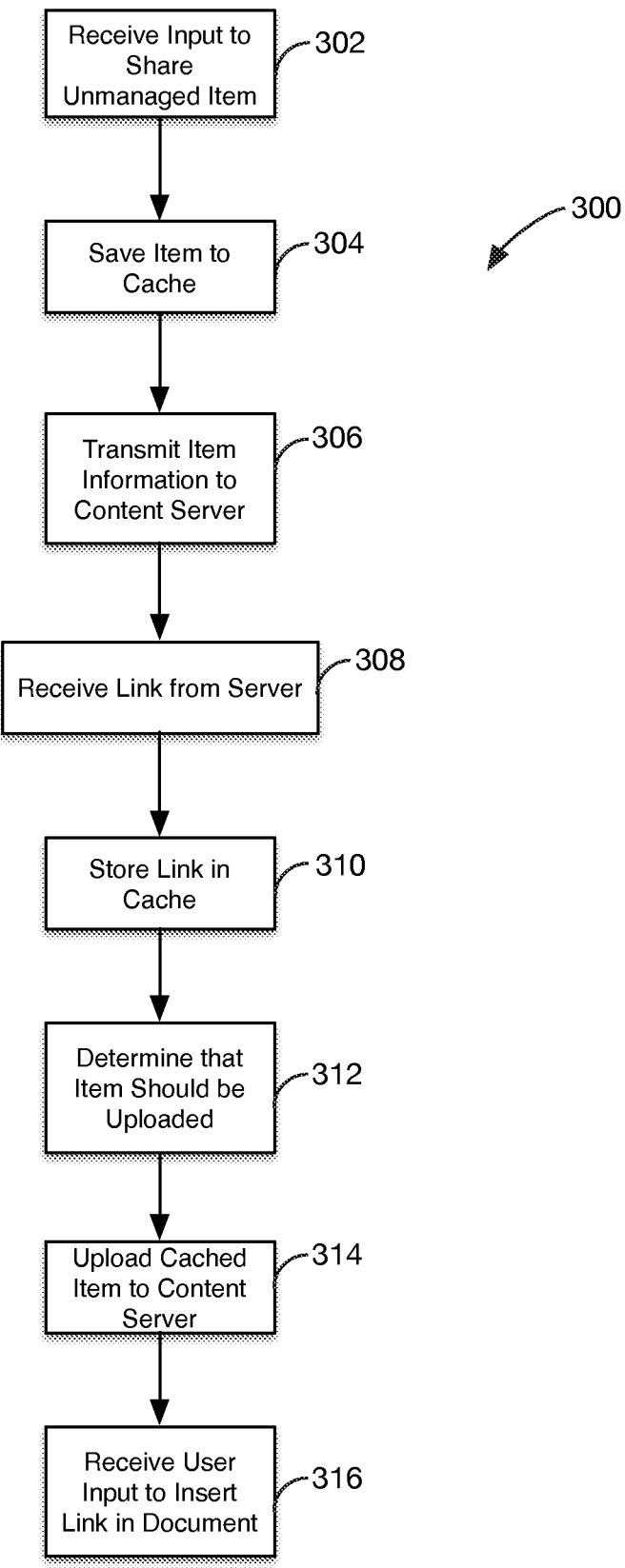
FIG. 3 shows an example client process for sharing a link to an unmanaged content item.

FIG. 3 shows an example client process 300 for sharing a link to an unmanaged content item. In some implementations, a user (e.g., subscriber) of online content management system 220 can share a link to an unmanaged content item. For example, the user can share a link to a content item that is stored externally to content library 210. The user can share a link to an unmanaged content item stored in client device 202 file system 206 using content client 204 and content management system 202, for example.

At step 302, a client device can receive user input to share an unmanaged content item. In some implementations, a user can select an unmanaged content item (e.g., file, image, video, audio, etc.) stored in file system 206 on client device 202 to share with a recipient. For example, the user can select the unmanaged content item and invoke the share link option using graphical user interface 100 of FIG. 1A.

At step 304, the client device can save a copy of the selected unmanaged content item to cache. For example, upon receiving the selection of the unmanaged content item and invoking the share link option, content client 204 can copy the selected content item to cache 208 (e.g., memory) on client device 202. In some implementations, content client 204 can determine whether client device 202 has enough memory available to copy the selected content item. If there is not enough memory available to copy the selected content item, the content client can present a notification to the user indicating that there is not enough memory available to complete the operation. If there is enough memory available to copy the content item, content client 204 can copy the content item into cache 208. By saving a copy of the unmanaged file to cache 208, content client 204 can create a snapshot of the selected content item representing the state of the content item at the point in time when the user selected to create a link for the content item. If the content item is subsequently changed in file system 206, the snapshot copy of the content item stored in cache 208 will not change.

At step 306, the client device can transmit information describing the selected content item to a content server. For example, content client 204 can generate a description of the selected unmanaged content item that includes, among other things, the directory location (e.g., content path) of the unmanaged content item within file system 206.

At step 308, the client device can receive a link for the unmanaged content item from the server. For example, content client 204 can send the unmanaged content item description to content manager 222 on content management system 220. Content manager 222 can create a metadata entry in external content meta store 228 that includes the data from the unmanaged content item description. For example, content manager 222 can generate an entry in the external content meta store 228 that includes the directory location of the unmanaged content item prefixed with a hidden namespace identifier (e.g., "hidden_ns") and a snapshot identifier (e.g., "snapshot1"). The metadata for the external content item can be represented in the external content meta store 228 as "hidden_ns:/snapshot/<snapshot id>/<content path>". Thus, if the selected unmanaged content item is located at "/user/pics/smiley.jpg" on client device 202, then the external content meta store 228 entry for the unmanaged content item can be "hidden_ns:/snapshot/snapshot1/user/pics/smiley.jpg," for example. Once the external content meta store 228 entry is generated for the unmanaged content item, a link (e.g., URL, content path, etc.) can be generated by content manager 222 that references the unmanaged content item entry on external content meta store 228. The content manager 222 can then return the link to content client 204. For example, by using the hidden namespace (e.g., not the user's content library namespace), the unmanaged content item will not show up in the user's content library when the content library is synchronized with and displayed on client device 202 thereby preserving the appearance of the unmanaged content item as being external to the user's content library.

At step 310, the client device can store the received link in the cache of the client device. For example, content client 204 can store the unmanaged content link in cache 208. Once the link is stored in cache 208, the user can insert the link into an electronic message, as described above with reference to GUI 150 of FIG. 1B.

At step 312, the client device can determine that the unmanaged content item should be uploaded to content management system 220. For example, content client 204 can generate hash values based on the content of the unmanaged content item. In some implementations, the unmanaged content item data can be stored as one or more data blocks. The content client 204 can generate a hash value for each data block. The content client 204 can transmit the hash values to content manager 222. The content manager 222 can compare the hash values to the hash values indexes corresponding to data blocks stored in content store 230. If the transmitted hash values match the hash value indexes, then the data blocks for the unmanaged content item do not need to be uploaded to content management system 220 since the data blocks already exist in content store 230. If a transmitted hash value does not match a hash value index in content store 230, then the data block corresponding to the transmitted hash value should be uploaded to the content management system 220 and stored in content store 230. The content manager 222 can generate a list of hash values that do not exist in content store 230 and transmit the list of hash values to content client 204 to indicate which data blocks are missing from content store 230.

At step 314, the client device can upload the unmanaged content item to content management system 220. For example, the content client can transmit to content manager 222 content data associated with each of the hash values received from content manager 222 at step 316. In some implementations, a content item upload initiated in response to generation of a link will be prioritized above other content upload or synchronization operations. For example, content client 204 will upload data blocks for a content item associated with a link before uploading or synchronizing other (e.g., non-linked) content library items. Once all of the data associated with the unmanaged content item has been uploaded to content management system 220, content client 222 can send a finalization message to content manager 222. For example, the finalization message can be configured to notify content manager 222 that all content data for the unmanaged content item has been uploaded to the content management system 220.

In some implementations, content client 204 can determine that the linked unmanaged content item changed while content client 204 was uploading the unmanaged content item to content management system 220. For example, while content client 204 is uploading the unmanaged content item to content management system 220, the user or client device 202 can change the content of the unmanaged content item. After the unmanaged content item has been uploaded to content management system 220, content client 204 can generate post upload hash values for the unmanaged content item stored in file system 206 and compare the post upload hash values to the hash values generated at step 306. If the hash values are different, then the content item stored on file system 206 has changed. When content client 204 determines that the content item has changed, content client 204 can indicate that the content item has changed in the finalization message. In some implementations, content client 204 can present a notification to the user indicating that the content item associated with the generated link has changed during the upload process.

At step 316, the client device can receive user input to insert the link in an electronic document. For example, the user can insert the link into an electronic message, as described above with reference to GUI 150 of FIG. 1B.

Figure 4:
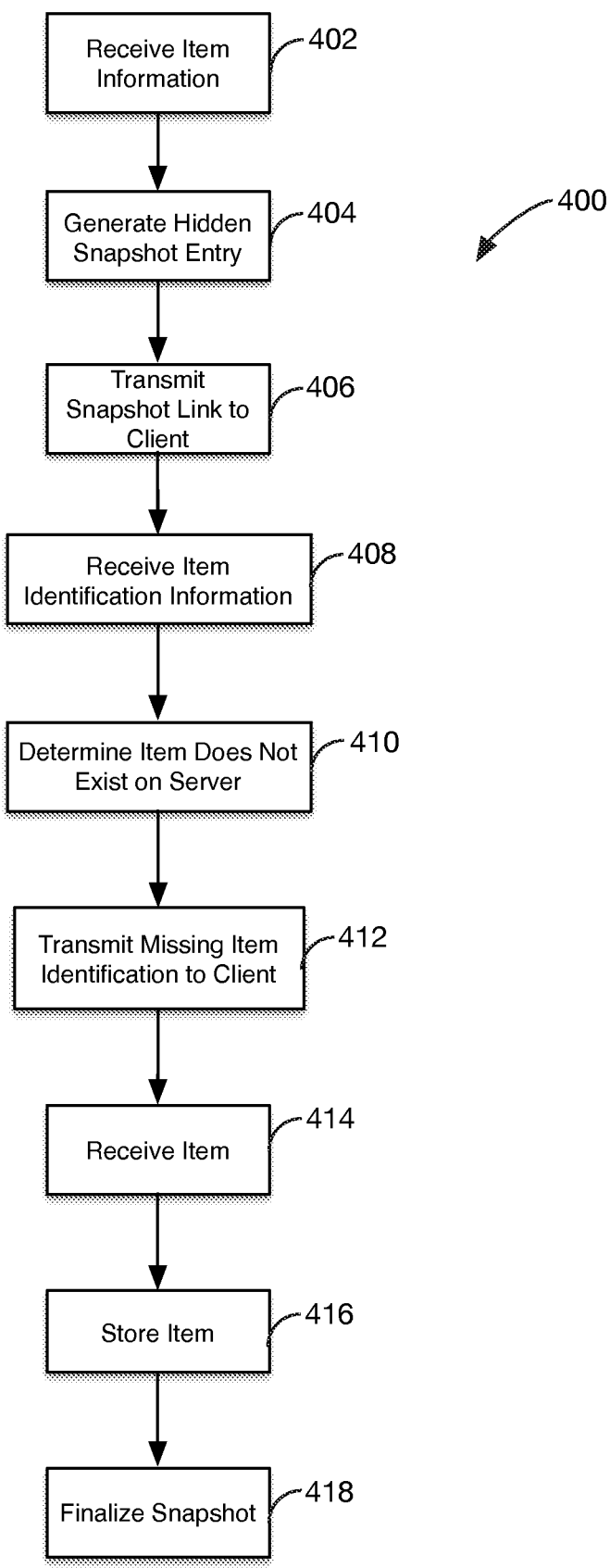
FIG. 4 shows an example server process for sharing a link to an unmanaged content item.

FIG. 4 shows an example server process 400 for sharing a link to an unmanaged content item. For example, the server (e.g., content management system 220) can store unmanaged content item metadata separately from managed content item metadata so that content items that are external to a user's content library are not displayed in the user's content library when the content library is displayed on client device 202.

At step 402, the server can receive information about an unmanaged content item. For example, content manager 222 can receive a request from content client 204 to generate a link for a content item that is not part of a user content library (e.g., content library 210). The request can include information (e.g., metadata) about the unmanaged content item. The information can include a directory path and file name corresponding to the location and identifier for the unmanaged content item.

At step 404, the server can generate a hidden snapshot entry for the unmanaged content item in external content meta store 228. For example, instead of generating a metadata entry in content library meta store 226 (e.g., used for managed content items), content manager 222 can generate a metadata entry in external content meta store 228 for the unmanaged content item. The metadata entry can include the directory path and content item identifier. The metadata entry can include a pointer to data blocks for the unmanaged content item data stored in content data store 230. For example, the metadata entry can store a string (e.g., "hidden ns:/snapshotksnapshot id>/<path>") that identifies the namespace for the entry (e.g., hidden ns), the snapshot identifier (e.g., shapshot id) for the entry and a path corresponding to the location in the client device directory structure where the unmanaged content item is located on client device 202.

At step 406, the server can transmit a snapshot link to the client device. For example, content manager 222 can generate a link (e.g., URL, address, etc.) to the metadata entry for the unmanaged content item that was generated at step 404 and send the link to content client 204 on client device 202.

At step 408, the server can receive information identifying the content of the unmanaged content item. For example, content client 204 can generate hash values based on the content data of the content item. Content client 204 can generate a single hash value for the unmanaged content item data. Content client 204 can generate a hash value for each block of data associated with the unmanaged content item. Once the hash values are generated, content client 204 can transmit the hash values to the content manager 222.

At step 410, the server can determine that the unmanaged content item is not currently stored at the server. For example, content manager 222 can compare the received hash values to hash value indexes corresponding to content data stored in content store 230. If the received hash values already exist in content store 230, content manager 222 can return an empty list of hash values to content client 204. If any of the received hash values do not already exist in content store 230, content manager 222 can return a list of the hash values for content data that does not already exist in content store 230.

At step 412, the server can transmit a list of identifiers for missing content item data to the client. For example, if any of the received hash values cannot be found in content store 230, content manager 222 can return a list of the hash values that do not exist in content store 230 to content client 204.

At step 414, the server can receive content data for the unmanaged content item. For example, content client 204 can transmit the unmanaged content item data corresponding to the hash values transmitted at step 412 to content manager 222.

At step 416, the server can store the content data for the unmanaged content item. For example, content manager 222 can store the received content data, indexed by hash value, in content store 230 and update the hidden snapshot metadata entry generated at step 404 by adding a pointer to the stored content data associated with the metadata entry. If the content data associated with the unmanaged content item was added to the content store 230, the pointer will point to the added content data. If the content data already existed in the content store 230, then the pointer will point to the existing content data in the content data store 230.

At step 418, the server can finalize the snapshot. For example, once all of the content data has been stored in content store 230 and the metadata entry for the unmanaged content item has been updated in external content meta store 228, the server can finalize the snapshot to allow a recipient of the link to the unmanaged content item to access the snapshot data. The server can finalize the snapshot in response to receiving a finalization message from content client 204, for example.

Figure 5:
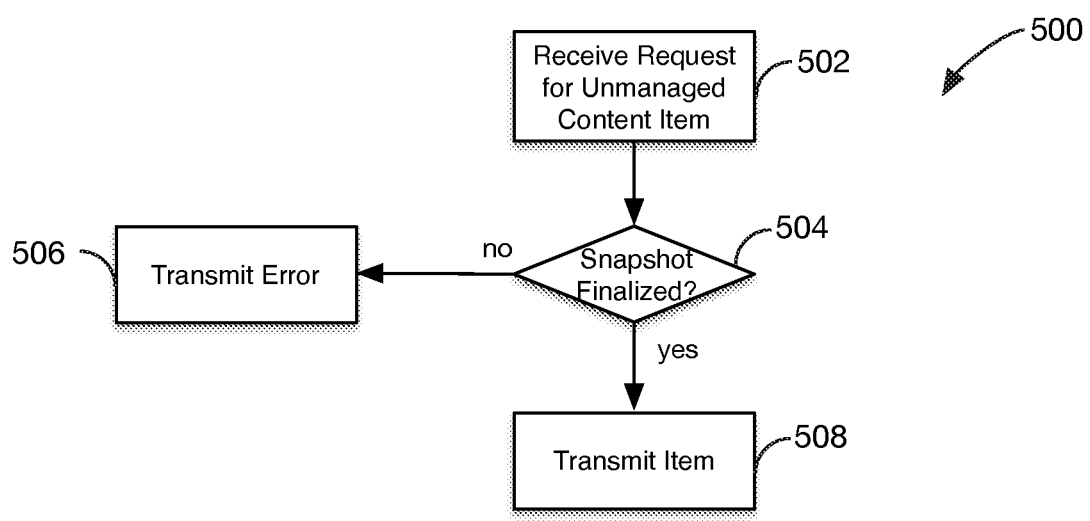
FIG. 5 shows an example server process for processing a request to access an unmanaged content item stored at a server.

FIG. 5 shows an example server process 500 for processing a request to access an unmanaged content item stored at a server. For example, process 500 can be initiated by a recipient of a link to an unmanaged content item when the recipient uses the link to access the unmanaged content item.

At step 502, the server can receive a request from a client device for an unmanaged content item. For example, the recipient can receive an electronic message (e.g., instant message, text message, email, etc.) that includes the link. The recipient can select the link, if the link is a selectable item (e.g., a hyperlink), to request the unmanaged content item associated with the link from the content management system 220. The recipient can copy the link and paste the link (e.g., URL) into a web browser to cause the web browser to request the unmanaged content item associated with the link from content management system 220.

At step 504, the server can determine whether the snapshot associated with the link has been finalized. For example, content manager 222 can determine that content manager has or has not received a finalization message from content client 204 with respect to the linked unmanaged content item. In some implementations, the metadata associated with the unmanaged content item can be marked as being finalized (e.g., with a true/false flag in the metadata entry). For example, the finalized flag can be set to true when the snapshot has been finalized. The finalized flag can be set to false when the snapshot has not been finalized.

At step 506, the server can transmit an error to the client device when the snapshot associated with the link has not been finalized. For example, if the recipient is using web browser to access the unmanaged content item associated with the link, content management system 220 can transmit to the web browser a web page that indicates that the snapshot is not ready for viewing yet. The web page can indicate that the recipient should try again later. If the recipient is using a client application (e.g., content client 204), content management system 220 (e.g., content manager 222) can return an error code to the content client indicating that the snapshot has not been finalized.

At step 508, the server can transmit the unmanaged content item to the client device when the snapshot associated with the link has been finalized. For example, content management system 220 (e.g., content manager 222) can transmit the unmanaged content item (e.g., the data stored in content store 230) to the client device.

Figure 6A:
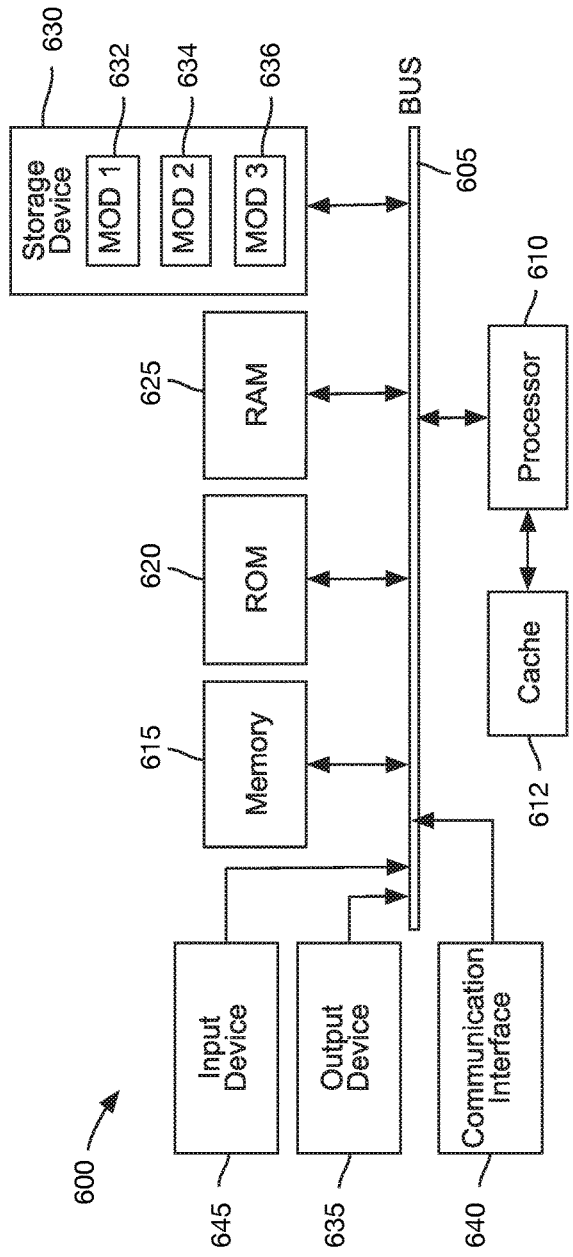
FIGS. 6A-6B show example system embodiments.
Figure 6B:
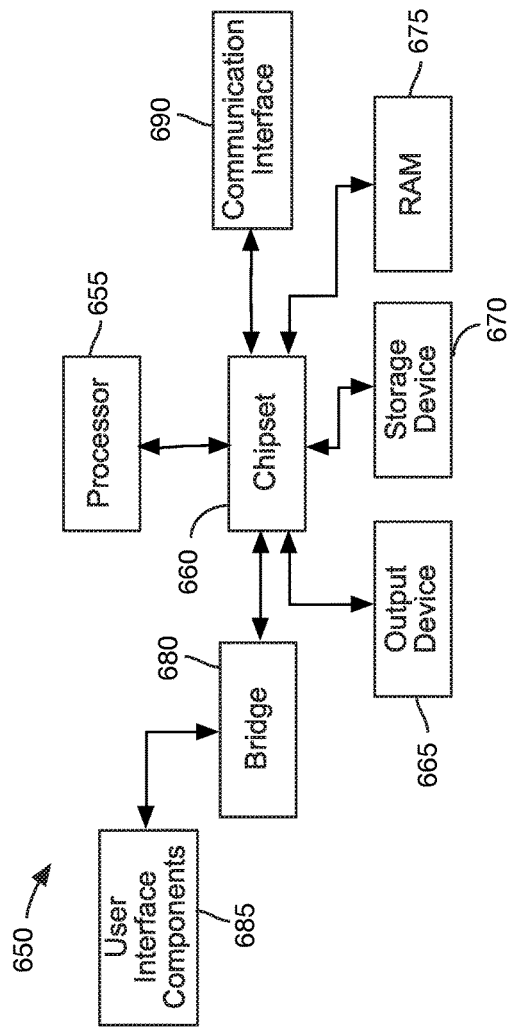

FIG. 6A, and FIG. 6B show example system embodiments. The systems described below can be configured to perform the operations described above with reference to FIGS. 1-5. The more appropriate embodiment will be apparent to those of ordinary skill in the art when practicing the present technology. Persons of ordinary skill in the art will also readily appreciate that other system embodiments are possible.

FIG. 6A shows a conventional system bus computing system architecture 600 wherein the components of the system are in electrical communication with each other using a bus 605. Example system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B shows a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

In some implementations, systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
storing, by a client device, content items in a local content library associated with a first namespace of a content management system, the local content library synchronized with a remote content library for the first namespace at the content management system;
identifying, by the client device, a content item external to the local content library;
receiving, at the client device, instructions to store the content item at the content management system;
in response to the instructions, transmitting, by the client device, information describing the content item to the content management system to store metadata for the content item in a second namespace at the content management system distinct from the first namespace associated with the remote content library at the content management system; and
receiving an indication, from the content management system, that the content item is stored in the second namespace at the content management system distinct from the first namespace associated with the remote content library.

2. The method of claim 1, further comprising:
generating the information describing the content item, prior to transmitting the information to the content management system.

3. The method of claim 2, wherein the information includes a directory path identifying where the content item is stored on the client device and indicates to the content management system that the content item is associated with the second namespace based on the information describing the content item.

4. The method of claim 1, further comprising:
generating one or more first hash values based on content of the content item;
transmitting the one or more first hash values to the content management system;
receiving one or more second hash values from the content management system that to a correspond portion of the one or more first hash values; and
transmitting, to the content management system, content of the content item corresponding to the one or more second hash values.

5. The method of claim 1 further comprising:
receiving, by the client device, a selection of the content item, wherein the content item is external to the first namespace; and
transmitting the content item to the content management system for storage associated with the second namespace.

6. The method of claim 1 further comprising:
requesting, by the client device, the content item based on the information describing the content item; and
receiving, from the content management system, the content item associated with the second namespace.

7. The method of claim 6, further comprising:
storing, at the client device, the content item in a cache; and
providing the content item from cache to an account associated with the second namespace.

8. A system comprising: one or more processors; and
at least one non-transitory computer readable medium storing instructions thereon, the instructions are effective to cause the one or more processors to:
store, by a client device, content items in a local content library associated with a first namespace of a content management system, the local content library synchronized with a remote content library for the first namespace at the content management system;
identify, by the client device, a content item external to the local content library;
receive, at the client device, instructions to store the content item at the content management system;
in response to the instructions, transmit, by the client device, information describing the content item to the content management system to store metadata for the content item in a second namespace at the content management system distinct from the first namespace associated with the remote content library at the content management system; and
receive an indication, from the content management system, that the content item is stored in the second namespace at the content management system distinct from the first namespace associated with the remote content library.

9. The system of claim 8, the instructions further effective to cause the one or more processors to:
generate the information describing the content item, prior to transmitting the information to the content management system.

10. The system of claim 9, wherein the information includes a directory path identifying where the content item is stored on the client device and indicates to the content management system that the content item is associated with the second namespace based on the information describing the content item.

11. The system of claim 8, the instructions further effective to cause the one or more processors to:
generate one or more first hash values based on content of the content item;
transmit the one or more first hash values to the content management system;
receive one or more second hash values from the content management system that to a correspond portion of the one or more first hash values; and
transmit, to the content management system, content of the content item corresponding to the one or more second hash values.

12. The system of claim 8, the instructions further effective to cause the one or more processors to:
receive, by the client device, a selection of the content item, wherein the content item is external to the first namespace; and
transmit the content item to the content management system for storage associated with the second namespace.

13. The system of claim 8, the instructions further effective to cause the one or more processors to:
request, by the client device, the content item based on the information describing the content item; and
receive, from the content management system, the content item associated with the second namespace.

14. The system of claim 13, the instructions further effective to cause the one or more processors to:
store, at the client device, the content item in a cache; and
provide the content item from cache to an account associated with the second namespace.

15. A non-transitory computer readable medium comprising instructions, the instructions, when executed by a computing system, cause the computing system to:
store, by a client device, content items in a local content library associated with a first namespace of a content management system, the local content library synchronized with a remote content library for the first namespace at the content management system;
identify, by the client device, a content item external to the local content library;
receive, at the client device, instructions to store the content item at the content management system;
in response to the instructions, transmit, by the client device, information describing the content item to the content management system to store metadata for the content item in a second namespace at the content management system distinct from the first namespace associated with the remote content library at the content management system; and
receive an indication, from the content management system, that the content item is stored in the second namespace at the content management system distinct from the first namespace associated with the remote content library.

16. The non-transitory computer readable medium of claim 15, wherein the instructions, when executed by the computing system, further cause the computing system to:
generate the information describing the content item, prior to transmitting the information to the content management system.

17. The non-transitory computer readable medium of claim 16, wherein the information includes a directory path identifying where the content item is stored on the client device and indicates to the content management system that the content item is associated with the second namespace based on the information describing the content item.

18. The non-transitory computer readable medium of claim 15, wherein the instructions, when executed by the computing system, further cause the computing system to:
receive, by the client device, a selection of the content item, wherein the content item is external to the first namespace; and
transmit the content item to the content management system for storage associated with the second namespace.

19. The non-transitory computer readable medium of claim 15, wherein the instructions, when executed by the computing system, further cause the computing system to:
request, by the client device, the content item based on the information describing the content item; and
receive, from the content management system, the content item associated with the second namespace.

20. The non-transitory computer readable medium of claim 19, wherein the instructions, when executed by the computing system, further cause the computing system to:
store, at the client device, the content item in a cache; and
provide the content item from cache to an account associated with the second namespace.

* * * * *